United States Patent [19]
Bittel et al.

[11] 4,027,263
[45] May 31, 1977

[54] FREQUENCY GENERATOR

[75] Inventors: Raymond H. Bittel, Reston, Va.;
Harry A. Helm, Bethesda, Md.;
Maurice J. Raffensperger, Reston, Va.

[73] Assignee: The United States of America as represented by the Secretary of the Army, Washington, D.C.

[22] Filed: May 7, 1976

[21] Appl. No.: 684,034

Related U.S. Application Data

[62] Division of Ser. No. 571,175, April 24, 1975, Pat. No. 3,992,580.

[52] U.S. Cl. .............................. 328/151; 328/159; 328/155
[51] Int. Cl.² ......................................... H03K 5/00
[58] Field of Search .......... 307/297; 328/151, 155, 328/159

[56] References Cited

UNITED STATES PATENTS

| | | | |
|---|---|---|---|
| 3,119,984 | 1/1964 | Brandt et al. | 328/151 X |
| 3,265,956 | 8/1966 | Schlabach | 307/297 X |
| 3,605,007 | 9/1971 | Jehle | 307/297 X |
| 3,671,852 | 6/1972 | Ritzenthaler | 307/297 X |

*Primary Examiner*—John S. Heyman
*Attorney, Agent, or Firm*—William G. Gapcynski; Lawrence A. Neureither; Frank R. Agovino

[57] ABSTRACT

A periodically adjustable frequency generator having as the source of the frequency signal a voltage controlled crystal oscillator. A power supply provides a continuous voltage to the oscillator which corresponds to the initial operating frequency. As a periodic error correction signal is received, it is fed through a delay circuit and then to a holding circuit which has an output equal to the last received input. The output of the holding circuit is summed with the power supply signal to provide a corrected voltage signal to the voltage controlled crystal oscillator.

1 Claim, 5 Drawing Figures

FREQUENCY GENERATOR

The invention described herein may be manufactured and used by or for the Government for governmental purposes without payment of any royalty thereon.

This is a division, of application Ser. No. 571,175 filed Apr. 24, 1975 now U.S. Pat. No. 3,992,580.

BACKGROUND OF THE INVENTION

This invention relates to voltage controlled frequency generators. More specifically, it relates to frequency generators having a continuous output and able to adjust its output in response to a periodic correction signal.

DESCRIPTION OF THE PRIOR ART

Found in the prior art are voltage controlled frequency generator which are used in digital network synchronization systems. These generators are configured to receive voltage signals which are continuously corrected and changed.

SUMMARY OF THE INVENTION

It is a related object of the present invention to eliminate the need to continuously correct a master oscillator that provides timing for nodal functions.

According to the present invention, the switching system of a digital communication network has a stable voltage controlled crystal oscillator (VCXO) to provide timing for functions such as TDM and modulation and demodulation, and nodal processor operation. Together with the VCXO interim storage devices are provided to accomplish link synchronization, into which the received demodulated pulse stream is read under the control of a recovered pulse stream timing signal. The VCXO provides the timing signal to read the pulses out of the storage device. Periodically at a node, all storage devices are sampled and error signals are derived, summed and weighted in a prescribed manner. This total error signal is then used to increase or decrease the frequency of the VCXO of the node. This sampling is performed periodically where the period for applied corrections may range over minutes to many hours and is a function of the number of nodes in the network, the storage device size, the VCXO specifications such as gain, setability, accuracy and drift, and transmission media anomalies. As a consequence of these periodic corrections, the VCXO will respond by increasing or decreasing its timing signal to provide the storage readout signal for the pulse stream to be input to the nodal processor.

BRIEF DESCRIPTION OF THE DRAWINGS

The following detailed description will enable the invention to be more fully comprehended. A list of relevant figures accompanies the description in which.

DESCRIPTION OF THE PREFERRED EMBODIMENT

Figure 2:
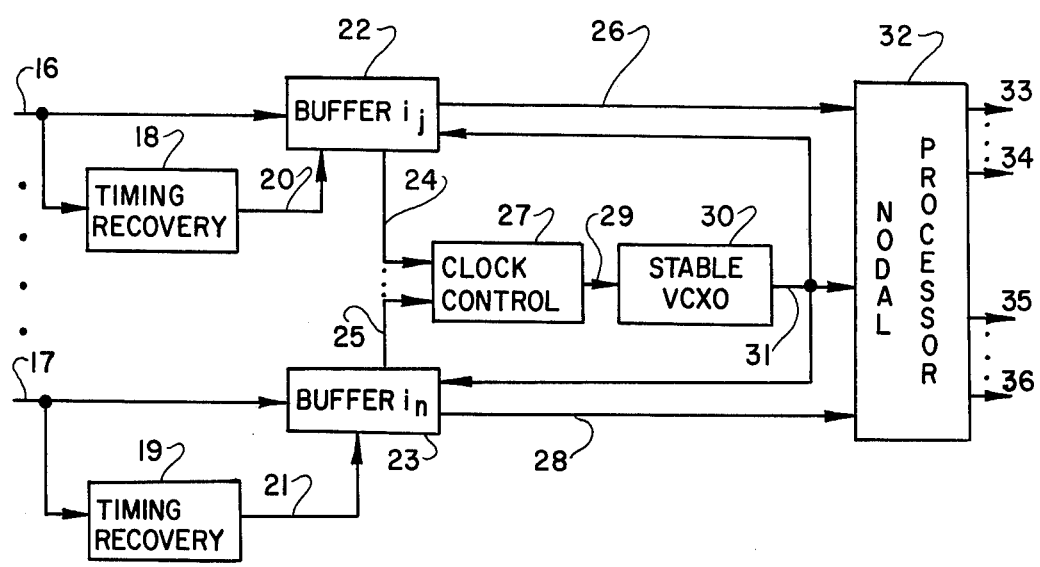
FIG. 2 is a block diagram showing a nodal synchronizing apparatus used in a system with a multiplicity of incoming pulse streams.

FIG. 2 shows a functional block diagram of the synchronization method in accordance with the present invention. Node $i$ receives data streams. These streams 16, 17 are demodulated and are input to timing recovery circuits 18, 19 and interim storage devices termed buffers 22, 23. The timing recovery circuits extract timing information from the received data streams in order to provide timing signals 20, 21 that the data streams may be read into the buffers. A buffer is provided for each incoming transmission line. Periodically, the buffers are sampled to provide signals 24, 25 that are input to the clock control mechanism 27. These signals are weighted and algebraically combined to provide a single signal 29 in the form of an equivalent voltage that is input to a stable voltage controlled crystal oscillator (VCXO) 30. The oscillator accepts this signal and uses it to change its frequency, either increasing or decreasing it as appropriate. This new frequency 31 is then used as a buffer read timing signal to read the pulse streams 26, 28 from the buffer. This new frequency is also input to the nodal processor 32 to be used for timing purposes within this unit. The output of the processor is transmitted to either terminating devices 33, 34 or to other nodes 34, 36.

Figure 4:
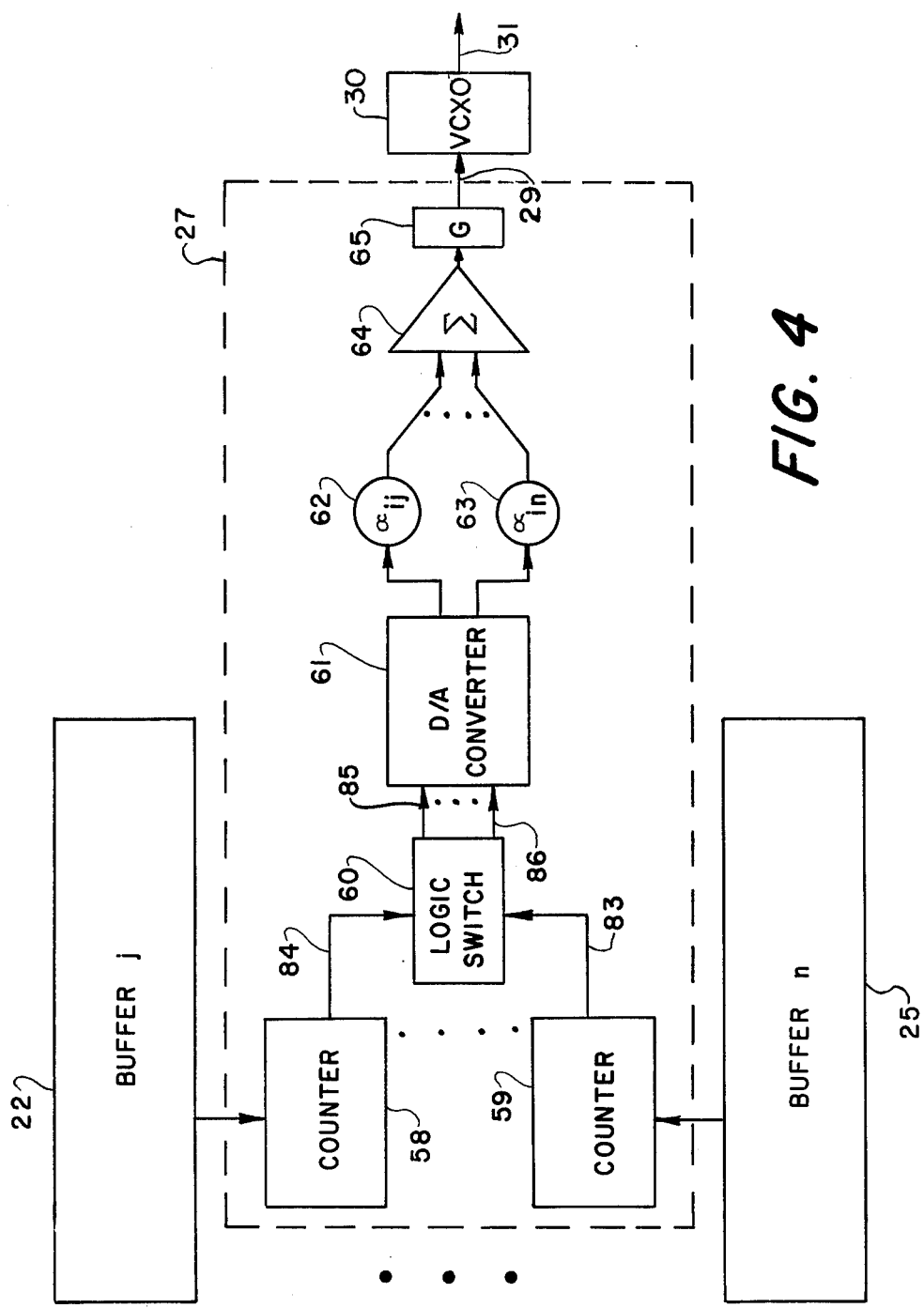
FIG. 4 is a diagram of the clock control.

FIG. 4 shows the clock control unit that is part of this invention. The counters 58, 59 monitor the pointer position with respect to the half full or zero buffer position. At a specific interval of $t$ seconds these counters are sampled by logic switch 60 and the resulting digital signals are input 85, 86 to a digital to analog converter 61. The resulting analog signals are then individually weighted 62, 63 according to pre-determined weighting factors $\alpha$ and combined by summer 60 to form one analog signal.

The combined signal is amplified 65 and then output 29 to a voltage controlled crystal oscillator 30. The resulting signal from the oscillator is used for necessary timing purposes as buffer readout, node processing and all logic timing.

Figure 3:
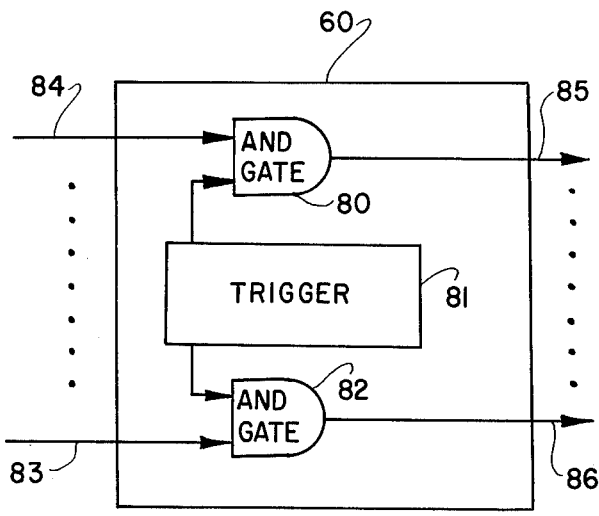
FIG. 3 is a block diagram of a conventional logic switch used to periodically sample a circuit.

Referring to FIG. 3, a conventional sampling circuit is illustrated. Counter outputs 83, 84 are connected to one of the inputs of standard AND gates 80, 82. To the other input of the AND gates 80, 82 are connected to trigger circuit 81 consisting of an integrated circuit with external resistor and capacitor components preset to pulse every $T$ seconds.

Figure 5:
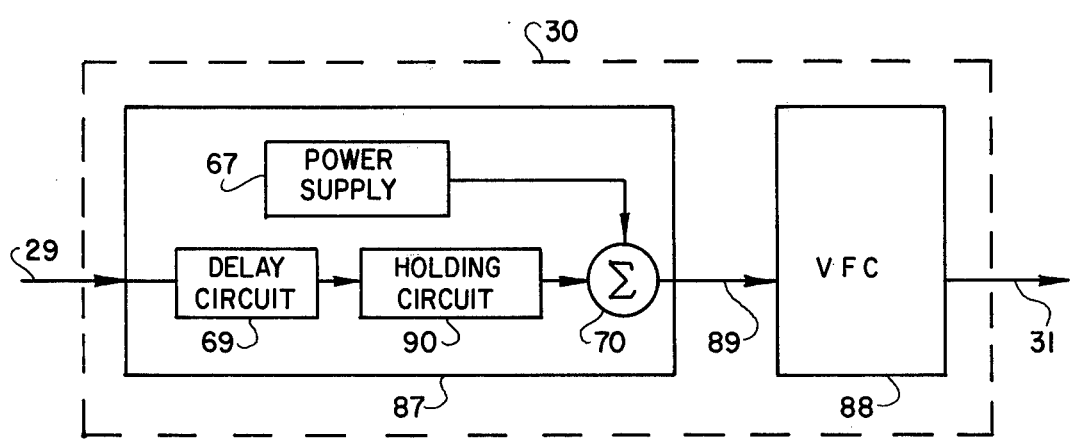
FIG. 5 is a diagram of the voltage controlled crystal oscillator.

A VCXO model is identified in FIG. 5. The input 29, which is in the form of a voltage, is connected to the input of the VCXO control 87. The voltage to frequency converter (VFC) 88 is a nonlinear device which converts the error input voltage 29 to an equivalent frequency 31. In effect, the input voltage 29 is used to adjust the operating frequency 31 of the VCXO. The error signal 29 from the clock control 27 is received by a delay circuit 69 which functions to pass the signal gradually over a given period of time which is much less than the correction period $T$. The delay circuit 69 output is connected to the input of a holding circuit 90 which is a power supply having a continuous voltage output equal to the last received voltage input. Power supply 67 provides a continuous voltage signal which corresponds to the initial operating frequency. The outputs of the power supply 67 and the holding circuit 90 are added linearly to form an output voltage signal 89 which corresponds to the operating frequency 31.

This signal 89 is fed into a voltage to frequency converter 88 which converts the signal to the equivalent operating frequency 31.

The VCXO in the invention does not function in the usual manner of a voltage controlled crystal oscillator. In the usual manner, the oscillator operating frequency, at the time of each correction, is used as a basis around which the correction is made. In this invention, the basic frequency around which the periodic correction is made is that stored in the power supply 87 as an equivalent voltage at the time the node is brought into operation and not the operating frequency of the oscillator at the correction time.

Figure 1:
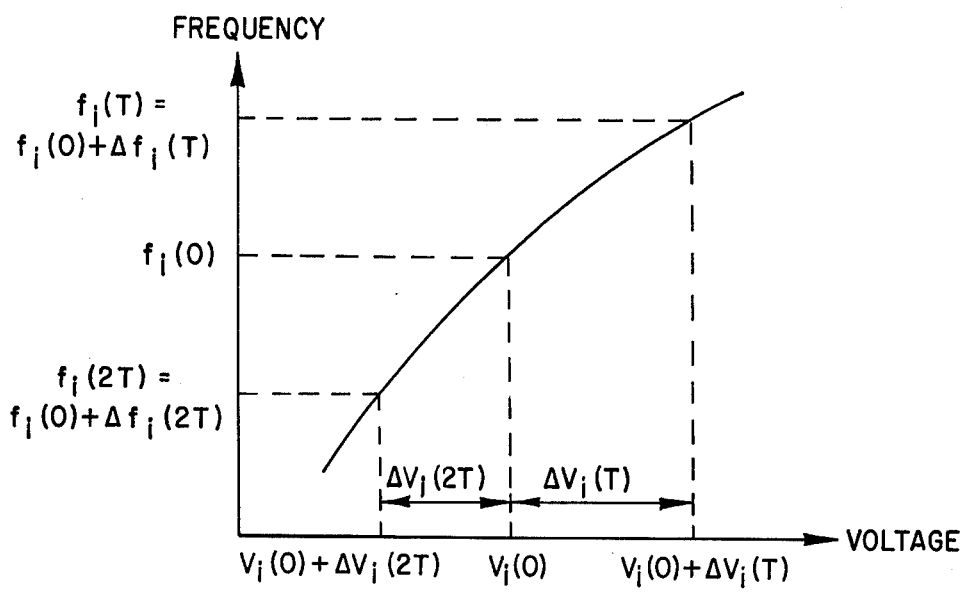
FIG. 1 is a graph of the VCXO operational function.

The VCXO function operation is shown in FIG. 1. The initial operating frequency, $f_i(0)$ is maintained by the power supply 67 as an equivalent constant voltage. At time $T$ seconds, the first correction is made. The voltage increment is $\Delta V_i(T)$ and is assumed positive. The conversion for $\Delta V_i(T)$ is $\Delta f_i(T)$ which is added to $f_i(0)$ to produce a new operating frequency $f_i(T)$. As discussed, the addition does not produce $f_i(T)$ immediately. Rather, the addition is carried out over a given time interval much less than the correction period $T$. The operating frequency $f_iT$ is not changed until the next correction time approximately $T$ seconds later. At that time, $t = 2T$, a new correction $\Delta V_i(2T)$, assumed negative, is made. The correction is not made to the operating frequency $f_i(0) + \Delta f_i(T)$ but rather to $f_i(0)$, the basic frequency. The new frequency, $f_i(2T) = f_i(0) + \Delta f_i(2T)$, is now used over the time period until the next correction at $t = 3T$ seconds. If the oscillator were operating in the usual manner, the new operating frequency at $t = 2T$ would be $f_i(2T) = F_i(0) + \Delta f_i(T) + \Delta f_i(2T)$. However, this usual operation is not evidenced in this invention.

In the ideal situation, when the steady state is reached, say at node $i$ and time $t = ST$, $\Delta V_i(ST) = 0$ and $f_i(ST) = f_i((s-1)T)$. Since $f_i(ST) = f_i(0) + \Delta f_i(ST)$ and $f_i((S-1)T) = f_i(0) + \Delta f_i((S-1)T)$ then $$\Delta f_i(ST) = \Delta f_i((S-1)T) \quad (1)$$

Equation 1 is accomplished by the apparatus through the function of the holding circuit 90. Since the holding circuit is a power supply with a continuous output equal to the input of the last voltage signal received by it, when the error input voltage 29 is zero at the steady state time $t = ST$, the holding circuit 90 continues to output the last signal received at time $t = (S-1)T$ which results in $\Delta f_i(ST) = \Delta f_i((S-1)T)$. Therefore, $f_i(ST) = f_i((S-1)T)$ and the steady state operating frequency is maintained.

Because the synchronization scheme allows for the selection of the weighting factors $\alpha_{ij}, j \neq i, j=1, 2, \ldots, n$, then by adjusting those factors, the synchronization can be configured as a master-slave system, an independent node system or a hierachical system. For a master-slave system, one node is designated the master, say node $k$, and if there are $m$ input lines than $\alpha_{kj}$ 0, $k \neq j, j=1, 2, \ldots, m$. That is, the master node is not corrected but rather distributes its time to all other nodes which operated in the manner described in this invention. The result of the repeated corrections is that all other node frequencies in the system will approach the master node frequency and in steady state will equal this frequency.

In an independent node system all $\alpha_{ij} = 0$ at each node indicating that no corrections are made to any clocks. Here the oscillators are independent and free running. For a hierachical system, some of the $\alpha_{ij}$'s at each node may be weighted more heavily than others. This indicates that certain nodes in the network are to be given more weight than others and have more influence on the weighted average steady state network operating frequency. Hence, a nodal hierachical structure may be super imposed on the network. In all cases, the stability constraint, $0 < GT\alpha_{ij} < (2/n)$, must be satisfied for all weighting factors $\alpha_{ij}$ at all nodes in the system.

The $T$ development given here is predicated on the fact that all nodes must correct simultaneously and carry $T$ seconds. For this invention, the more general case, nodes correcting approximately every T seconds and not all correcting simultaneously still has the stability boundary as derived, and the network will converge to a weighted average of the base frequencies. However, the convergence will take a greater time and more correction than that of simultaneous correction.

We claim:
1. An adjustable frequency generator comprising:
   a. delaying means for passing a signal gradually having an input for receiving a voltage adjusting signal and an output;
   b. holding circuit means for holding and transmitting a continuous voltage signal equivalent to the last received voltage signal having an input connected to said delaying means output and an output;
   c. a voltage power supply for providing a continuous voltage signal corresponding to a base frequency having an output;
   d. summing means for adding the power supply signal and the voltage adjusting signal from said holding circuit means output having a first input connected to said power supply output, a second input connected to said holding circuit means output and an output providing a voltage signal; and
   e. a voltage to frequency converter having an input connected to said summing means output whereby a voltage error signal received by said delaying means input results in a corresponding change in the frequency of the converter.

* * * * *